United States Patent [19]

Prospero et al.

[11] Patent Number: 5,590,814
[45] Date of Patent: Jan. 7, 1997

[54] METHOD AND APPARATUS FOR LOADING BOBBIN CORES

[75] Inventors: Richard M. Prospero, Princeton; Erik Lunde, Morganville; Harry Swanson, Bloomfield; Lee Adams, Flemington, all of N.J.

[73] Assignee: Johnson & Johnson Consumer Products, Inc., Skillman, N.J.

[21] Appl. No.: 382,224

[22] Filed: Jan. 31, 1995

[51] Int. Cl.⁶ .................................................. B65G 59/00
[52] U.S. Cl. ........................................... 221/266; 139/247
[58] Field of Search .................................. 221/266, 277, 221/263, 167, 268; 139/245, 247, 248

[56] References Cited

U.S. PATENT DOCUMENTS

| | | | |
|---|---|---|---|
| 1,038,898 | 9/1912 | Koechlin | 139/245 |
| 1,053,123 | 2/1913 | Diederichs | 139/246 |
| 3,785,509 | 1/1974 | Girardi | 221/266 |
| 4,858,770 | 8/1989 | Gamberini | 209/535 |
| 5,191,964 | 3/1993 | Spisak et al. | 198/447 |
| 5,269,117 | 12/1993 | Boriani et al. | 53/234 |

Primary Examiner—Kenneth Noland

[57] ABSTRACT

A method and apparatus for loading a bobbin core from a plurality of bobbin cores onto a bobbin winding device. A plurality of stacked bobbin cores are received into a first end of a first chute. The first chute has a second end positioned adjacent to a rotatable hub. A bobbin core from the plurality of stacked bobbin cores in the first chute is received into a bobbin core holder on the rotatable hub. The rotatable hub is then rotated with hub driving means such that the bobbin core holder on the rotatable hub moves from the second end of the first chute to a first end of a second chute, the first end of the second chute being positioned adjacent to the rotatable hub. The second chute also includes a second end positioned adjacent to the bobbin winding device. The bobbin core previously received into the bobbin core holder is then dispensed onto the bobbin winding device by passing the bobbin core through the second chute.

9 Claims, 5 Drawing Sheets

METHOD AND APPARATUS FOR LOADING BOBBIN CORES

FIELD OF THE INVENTION

The present invention relates generally to systems for winding threads or yarns onto winding cores. More particularly, the present invention relates to automatic systems for loading and dispensing individual winding cores onto a winding device. Still more particularly, the present invention relates to a system for loading and dispensing empty bobbin cores onto dental floss winding machines.

BACKGROUND OF THE INVENTION

Tooth decay and dental disease can be caused by bacterial action resulting from the formation of plaque about the teeth and/or the entrapment of food particles between the teeth and interstices therebetween. The removal of plaque and entrapped food particles reduces the incidence of caries, gingivitis, and mouth odors as well as generally improving oral hygiene. Conventional brushing has been found to be inadequate for removing all entrapped food particles and plaque. To supplement brushing, dental flosses and tapes have been recommended. The term "dental floss", as used herein, is defined to include both dental flosses, dental tapes and any similar article.

Dental floss is typically distributed in dispensers that have circular bobbins rotatably mounted therein. Each bobbin is formed of a core that has been wound with dental floss. The tail end of floss from the bobbin is typically threaded first through an eyelet at the top of the dispenser and then through a cut bar that is also positioned at the top of the dispenser. In order to draw a length of floss from the dispenser, a user grasps the tail end of the floss, pulls until the desired length of floss has been drawn from the dispenser, and then cuts the drawn length using the cut bar. As the user pulls the floss from the dispenser, the bobbin in the dispenser rotates, thereby allowing the floss on the bobbin to unwind.

During the manufacturing of dental floss products, automated winding machines are used to wind floss onto empty bobbin cores. These automated winding machines typically use a mounting apparatus such as a winding arbor for receiving and holding bobbin cores during the winding process. Each winding arbor must typically be loaded with an empty bobbin core prior to the time any floss is wound on the bobbin core. It is possible to perform this bobbin core loading operation manually, however, the use of labor for this operation is undesirable from a cost point of view.

It is therefore an object of the present invention to provide an efficient and cost-effective system for loading empty bobbin cores onto winding arbors in an automated fashion.

It is a further object of the present invention to provide an automated system for loading bobbin cores one-at-a-time onto winding arbors.

It is a still further object of the present invention to provide a bobbin core loading system which can monitor and verify that bobbin core loading has occurred.

It is a still further object of the present invention to provide a bobbin core loader that is resistant to jamming.

These and still other objects of the invention will become apparent upon study of the accompanying drawings and description of the invention.

SUMMARY OF THE INVENTION

The present invention is directed to a method and apparatus for loading a bobbin core from a plurality of bobbin cores onto a bobbin winding device. A plurality of stacked bobbin cores are received into a first end of a first chute. The first chute has a second end positioned adjacent to a rotatable hub. A bobbin core from the plurality of stacked bobbin cores in the first chute is received into a bobbin core holder on the rotatable hub. The rotatable hub is then rotated with hub driving means such that the bobbin core holder on the rotatable hub moves from the second end of the first chute to a first end of a second chute, the first end of the second chute being positioned adjacent to the rotatable hub. The second chute also includes a second end positioned adjacent to the bobbin winding device. The bobbin core previously received into the bobbin core holder is then dispensed onto the bobbin winding device by passing the bobbin core through the second chute.

DETAILED DESCRIPTION OF THE PREFERRED EMBODIMENT

Figure 1:
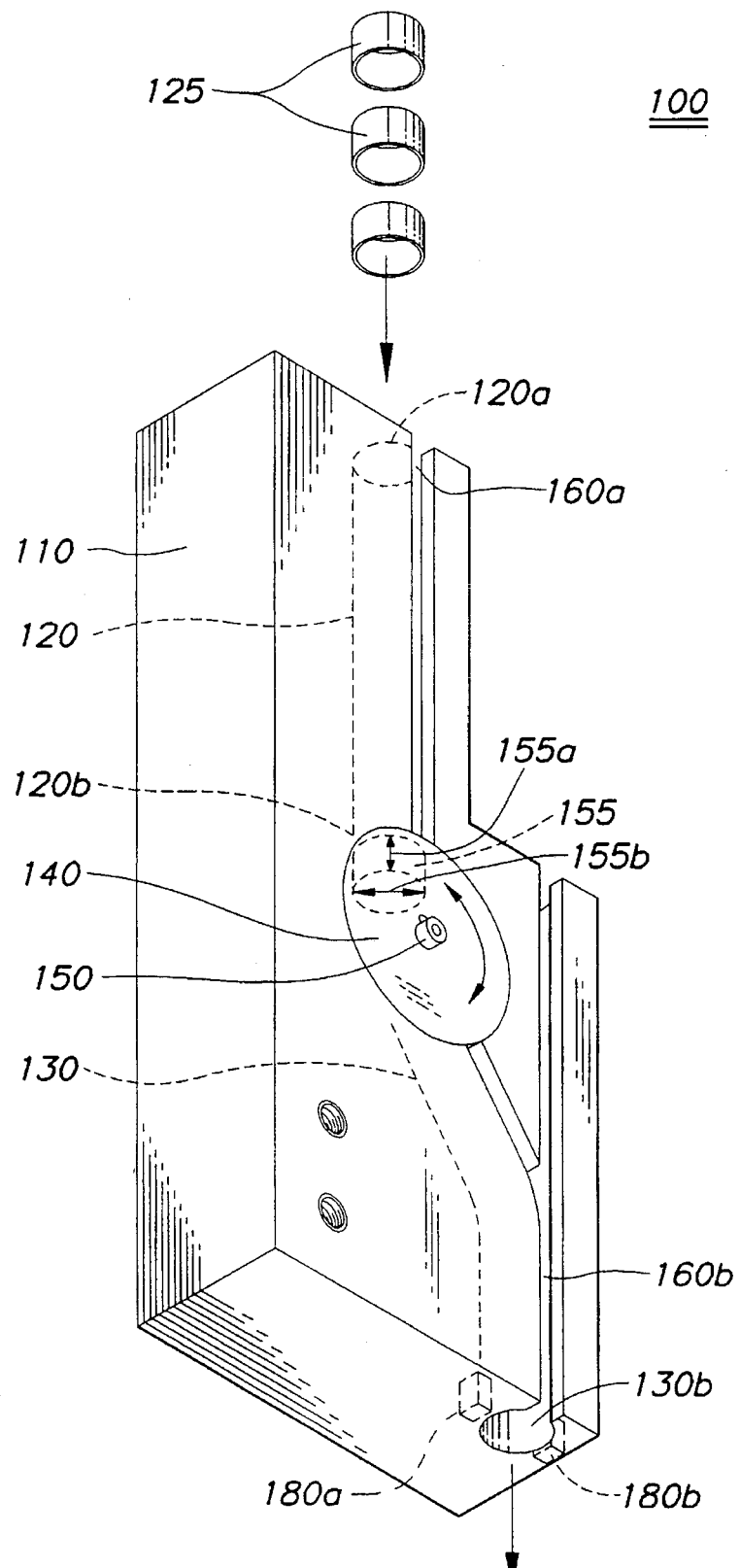
FIG. 1 is a worms eye view of a bobbin core loading device in accordance with a preferred embodiment of the present invention.
Figure 2:
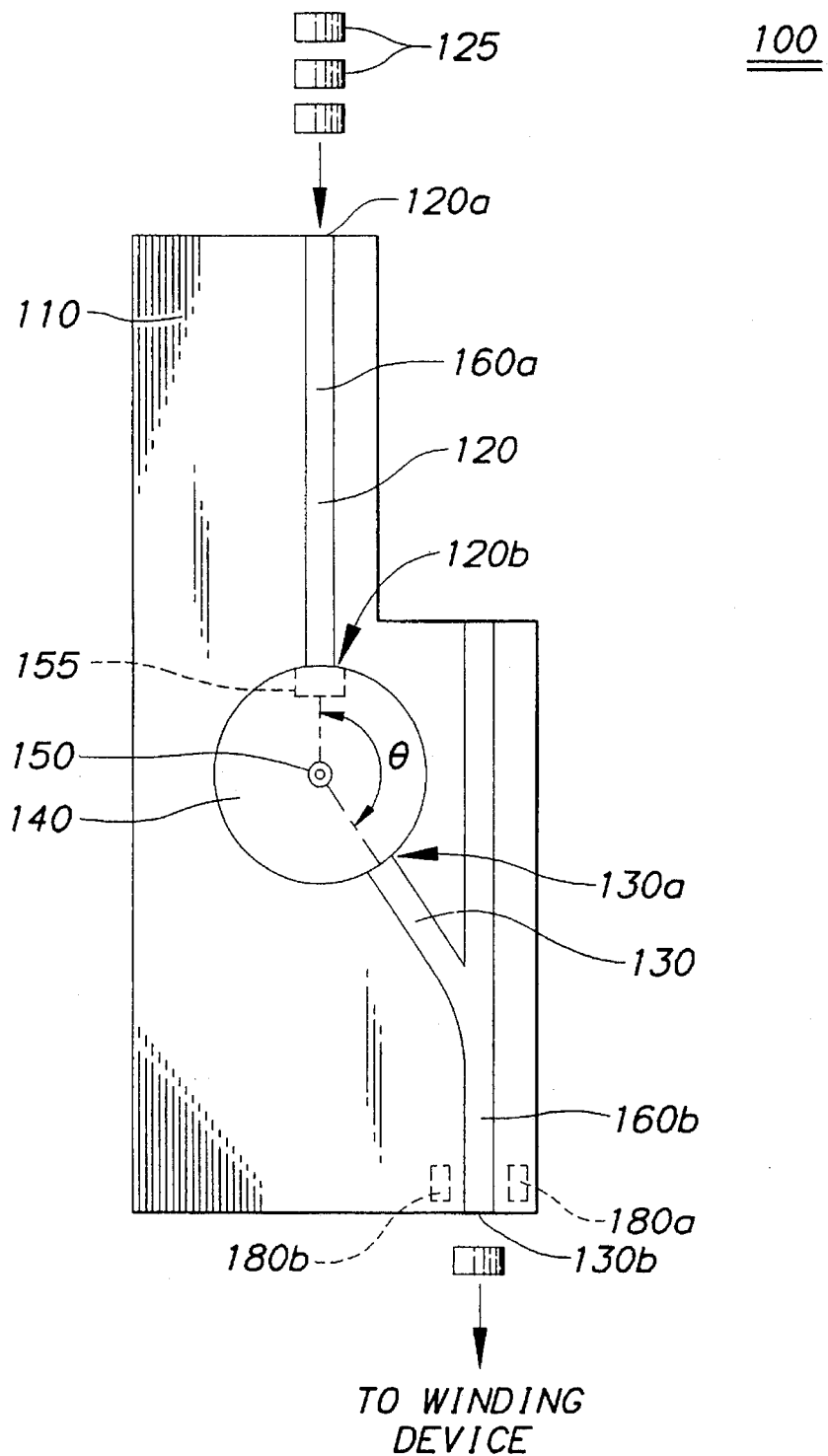
FIG. 2 is a front view of a bobbin core loading device in accordance with a preferred embodiment of the present invention.
Figure 3:
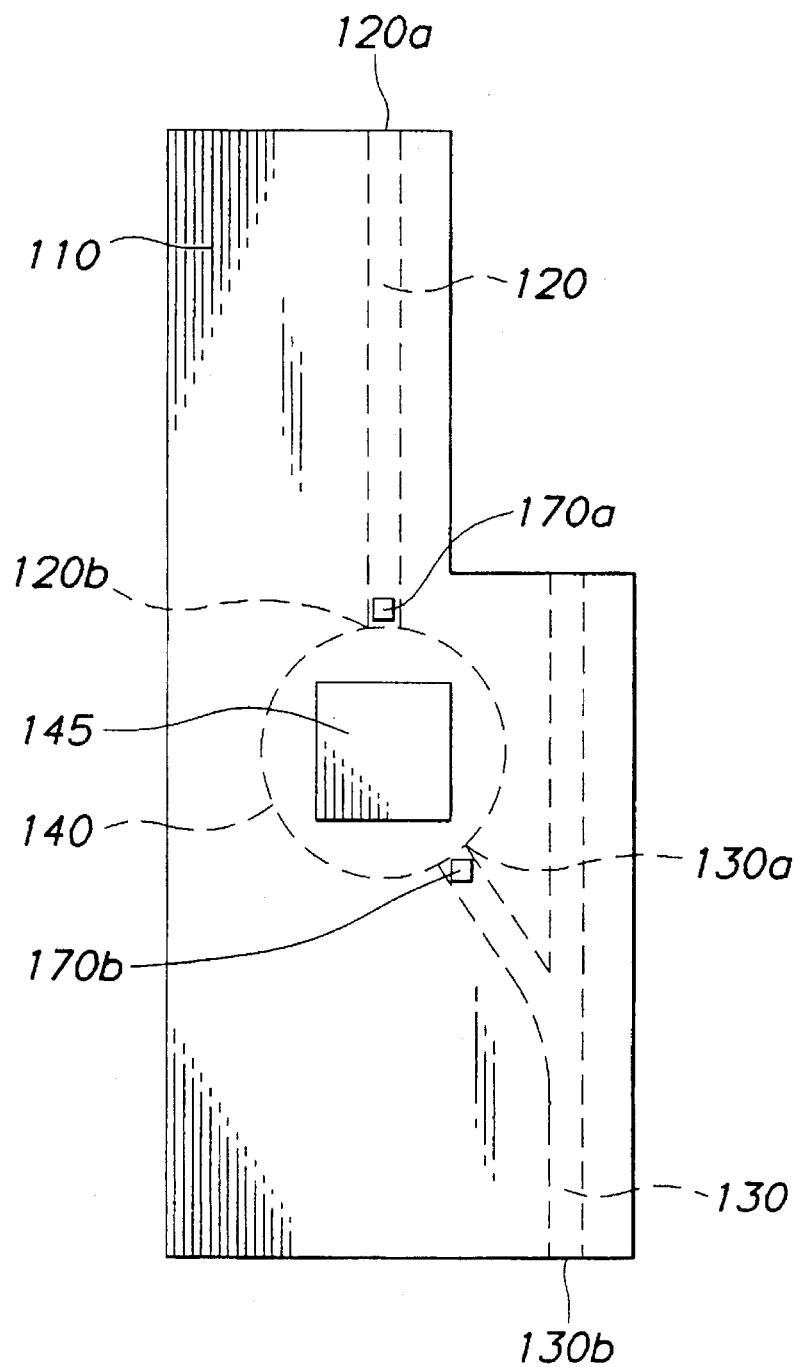
FIG. 3 is a rear view of a bobbin core loading device in accordance with a preferred embodiment of the present invention.

Referring now to FIGS. 1–3, there are shown worms-eye, front and rear views, respectively, of a bobbin core loading device 100 in accordance with a preferred embodiment of the present invention. Loading device 100 is formed of a block 110 having several tubular passages within its interior. In particular, block 110 has a first tubular chute 120 for receiving stacked bobbin cores 125 into the top of loading device 100. Block 110 also includes a second tubular chute 130 for dispensing or loading empty bobbin cores one-at-a-time onto a winding device (not shown).

A rotatable hub 140 is positioned between the receiving chute 120 and the dispensing chute 130. The receiving chute 120 has a first end 120a at the top of loading device 100 and extends therefrom to its second end 120b which is positioned adjacent to rotatable hub 140. Dispensing chute 130 has a first end 130a positioned adjacent to rotatable hub 140. Dispensing chute 130 extends from its first end 130a to its second end 130b which is preferably positioned above a winding device.

Rotatable hub 140 is connected to a pneumatic actuator 145 by a driving pin 150. Driving pin 150 defines the axis of rotation of rotatable hub 140. Rotatable hub 140 is preferably formed of a cylindrical block and has a cylindrical opening 155 which is perpendicular to the perimeter of hub 140. Opening 155 has a depth 155a that is approximately equal to the thickness of a bobbin core 125, and a diameter 155b that is approximately equal to the diameter of a bobbin core 125. Opening 155 defines a bobbin core holder.

During operation of loading device 100, stacked bobbin cores 125 are continually received into receiving chute 120 through end 120a. The stacked bobbin cores 125 are then carried one-at-a-time by bobbin core holder 155 from end 120b of receiving chute 120 to end 130a of dispenser chute 130. This carrying step is accomplished by first aligning bobbin core holder 155 under end 120a of receiving chute 120 until a single bobbin core 125 falls (by gravity) into bobbin core holder 155, and then rotating hub 140 in a clockwise direction along an angular distance equivalent to the angle theta shown in FIG. 2. When rotatable hub 140 reaches the end of this angular rotation, bobbin core holder 155 will be positioned adjacent to and aligned with end 130a of dispensing chute 130. As bobbin core holder 155 rotates into alignment with end 130a, the bobbin core 125 within bobbin core holder 155 will fall (by gravity) into and then through the dispensing chute 130. In the preferred embodiment, following the dispensing of a bobbin core 125 through the dispenser chute 130, hub 140 then rotates in a counterclockwise direction along an angular distance equivalent to the angle theta shown until bobbin core holder 155 again comes into alignment under end 120a of receiving chute 120 and a further bobbin core 125 falls (by gravity) into bobbin core holder 155. In the preferred embodiment, the process described above is then repeated sequentially in order to dispense individual bobbin cores 125 through dispenser chute 130 at regular intervals.

Although in the preferred embodiment, bobbin core holder 155 successively moves from end 120b to end 130a and then from end 130a to end 120b by an oscillatory motion that includes alternating clockwise and counterclockwise movements, it will be understood by those skilled in the art that core holder 155 could alternately move from end 120b to end 130a and then from end 130a to end 120b by rotating either sequentially or continuously in a single angular direction.

The rotation of hub 140 is preferably driven by a pneumatic actuator 145, although any standard motor may be used. In the preferred embodiment, pneumatic actuator 145 drives hub 140 such that bobbin core holder 155 moves first clockwise from end 120b to end 130a and then counterclockwise from end 130a to end 120b in a time period of 0.01 to 0.50 seconds. Also in the preferred embodiment, the oscillation of bobbin core holder from end 120b to end 130a and then back from end 130 to end 120b is repeated 30-40 times per minute, thus allowing core loader 100 to dispense up to 40 individual cores one-at-a-time per minute through end 130b.

In order to prevent jams from occurring within chutes 120 or 130, these chutes should preferably be formed of smooth metal surfaces and should have diameters that closely approximate the diameter of a bobbin core 125. In a preferred embodiment, the diameters of chutes 120 and 130 are within 0.005" of the diameter of a bobbin core 125. Although the present invention is designed to prevent the jamming of bobbin cores 125 anywhere within loading device 100, openings 160a and 160b are provided along the front face of block 110 thereby giving an operator easy access to the interiors of the receiving chute 120 and dispensing chute 130 in order to clear any jams that may occur in the device. In order to prevent cores 125 from passing through the openings 160a, 160b during operation of the device, openings 160a, 160b have a width that is less than the diameter of a bobbin core 125.

Figure 5:
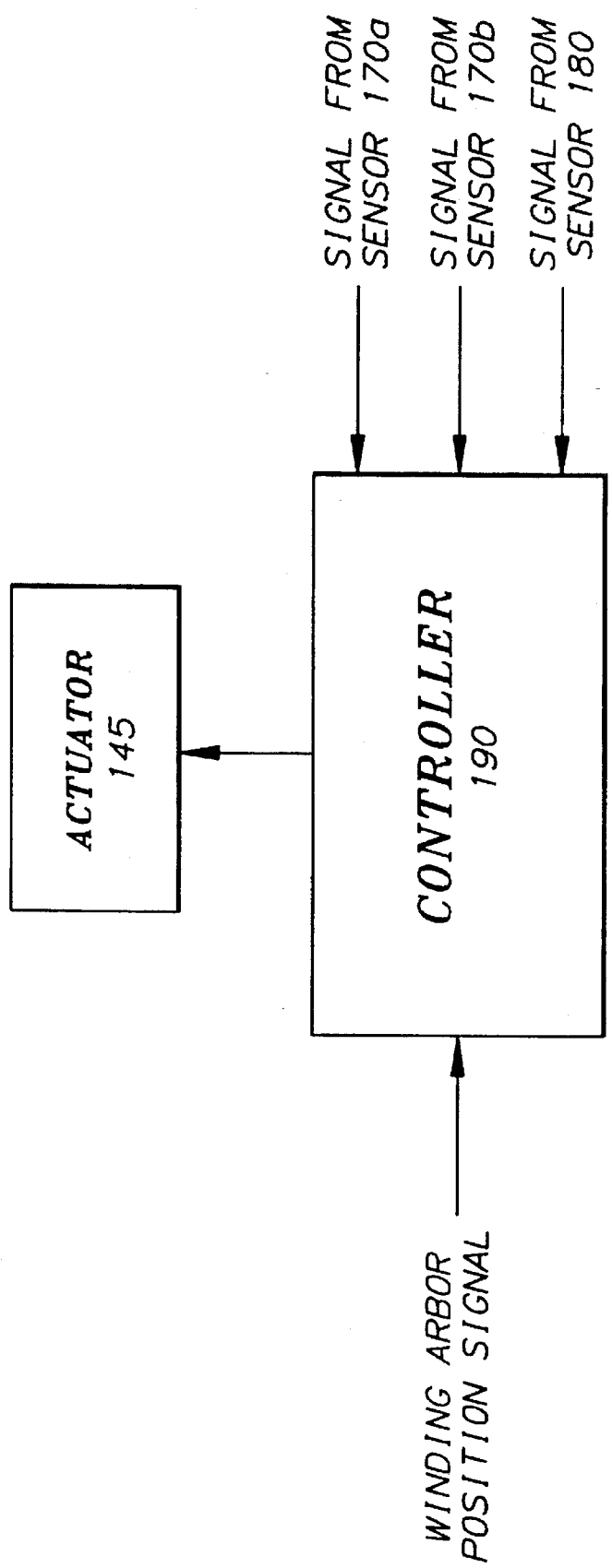
FIG. 5 is a block diagram showing a hub drive controller in accordance with a preferred embodiment of the present invention.

In order to verify the proper operation of core loader 100, the present invention includes several sensors for monitoring different aspects of the operation of the device. In particular, a pair of magnetic sensors 170a, 170b are affixed to the rear of core loader 100. Sensor 170a is positioned behind end 120b and is used for sensing and verifying that bobbin core holder 155 is aligned with end 120b. Similarly, sensor 170b is positioned behind end 130a and is used for sensing and verifying that bobbin core holder 155 is aligned with end 130a. An optical sensor 180 (formed of a light source 180a and an optical receiver 180b) is positioned near the base of chute 130. As shown in FIG. 5, the outputs from sensors 170a, 170b and 180 are all coupled to a controller 190 for controlling the movement of pneumatic actuator 145.

Figure 4:
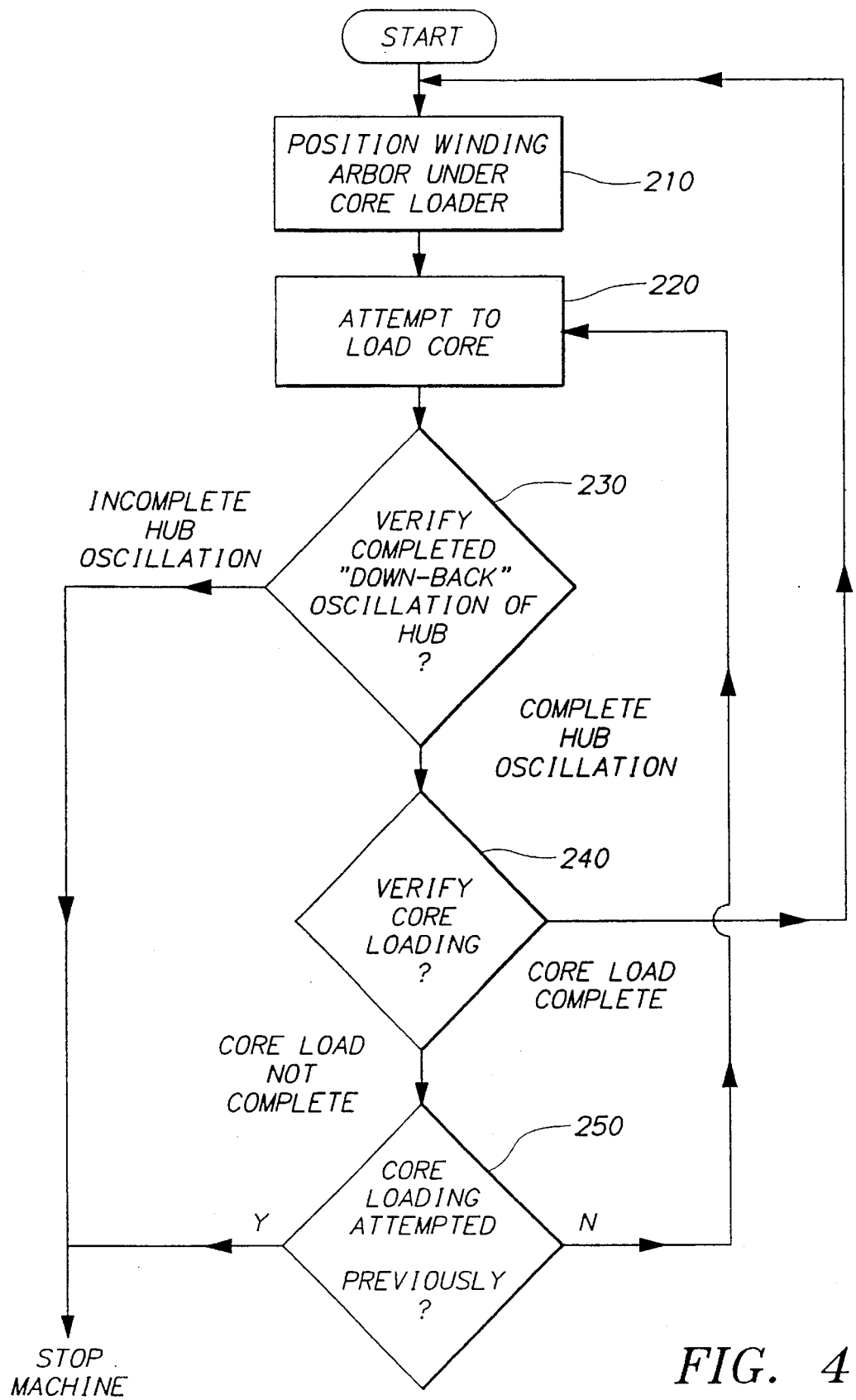
FIG. 4 is a flow diagram illustrating the operation of a bobbin core loading device in accordance with a preferred embodiment of the present invention.

Referring now to FIG. 4, there is shown a flow diagram illustrating the operation of a bobbin core loading device in accordance with a preferred embodiment of the present invention. The operation begins in step 210 by waiting for a signal that a core winding device (such as a winding arbor for winding dental floss onto a bobbin core) is positioned below dispenser chute 130. Upon receipt of a signal indicating that a winding arbor is in position, processing proceeds to step 220 where controller 190 attempts to load a core by causing bobbin core holder 155 to rotate from end 120b to end 130a and then back from end 130a to end 120b. During this oscillation, controller 190 monitors the outputs of sensors 170a and 170b to verify that a complete oscillation has actually occured. If the output of sensors 170a and 170b indicate that a complete oscillation did not occur, then (in step 230) the core loader 100 is placed in an off state; otherwise processing proceeds to step 240 where the output of sensor 180 is checked in order to verify that a bobbin core passed through chute 130. If sensor 180 was able to verify the passage of a bobbin core 125 through chute 130, then processing proceeds to step 210 and the process is repeated. If sensor 180 was unable to verify the passage of a bobbin core 125 through chute 130, then processing proceeds to step 250 where a determination is made regarding the number of previous unsuccessful attempts that have made to load a bobbin core 125. In step 250, the number of previous unsuccessful attempts that have been made to load a bobbin core 125 is monitored and compared against a threshold k. If the threshold number of unsuccessful loading attempts has been reached, then the core loader is placed in an off state; otherwise, processing proceeds to step 220 where a further attempt is made to load a bobbin core. In a preferred embodiment, k is set 1, although other values may alternatively be used.

The present invention may be embodied in other specific forms without departing from the spirit or essential attributes of the invention. Accordingly, reference should be made to the appended claims, rather than the foregoing specifications, as indicating the scope of the invention.

What is claimed is:

1. An apparatus for dispensing bobbin cores, comprising:

(A) a first chute for holding a plurality of stacked bobbin cores, said first chute having a first end for receiving said plurality of stacked bobbin cores into said first chute, said first chute having a second end positioned adjacent to a rotatable hub;

(B) a second chute for dispensing cores from said plurality of stacked bobbin cores onto a bobbin winding device, said second chute having a first end positioned adjacent to said rotatable hub, said second chute having a second end positioned adjacent to said bobbin winding device;

(C) said rotatable hub having a bobbin core holder for carrying a bobbin core from said plurality of stacked bobbin cores from said second end of said first chute to said first end of said second chute;

(D) hub driving means for rotating said bobbin core holder from said second end of said first chute to said first end of said second chute;

(E) first sensor means for verifying movement of said bobbin core holder from said second end of said first chute to said first end of said second chute; and (F) second sensor means for verifying passage of a bobbin core through said second chute.

2. The apparatus of claim 1, further comprising:

(G) a controller, coupled to said first and second sensor means and said hub driving means, for controlling said hub driving means.

3. The apparatus of claim 2, wherein said first sensor means is comprised of a first magnetic sensor positioned adjacent to said second end of said first chute and a second magnetic sensor positioned adjacent to said first end of said second chute.

4. The apparatus of claim 3, wherein said second sensor means is comprised of an optical sensor positioned along said second chute.

5. The apparatus of claim 4, wherein said bobbin winding device is a winding arbor for winding dental floss.

6. A method for loading a bobbin core form a plurality of bobbin cores onto a bobbin winding device, comprising the steps of:

(A) receiving said plurality of stacked bobbin cores in a first chute, said first chute having a first end for receiving said plurality of stacked bobbin cores into said fist chute, said first chute having a second end positioned adjacent to a rotatable hub;

(B) receiving into a bobbin core holder on said rotatable hub a bobbin core from said plurality of stacked bobbin cores;

(C) rotating with hub driving means said bobbin core holder on said rotatable hub from said second end of said first chute to a first end of a second chute, said first end of said second chute being positioned adjacent to said rotatable hub, said second chute having a second end positioned adjacent to said bobbin winding device;

(D) dispensing said bobbin core received in step (B) onto said bobbin winding device by passing said bobbin core through said second chute;

(E) after said dispensing step, rotating with said hub driving means said bobbin core holder on said rotatable hub from said first end of said second chute to said second end of said first chute;

(F) repeating steps (B) through (F) for a plurality of cycles;

(G) verifying with first sensor means movement of said bobbin core holder during step (C); and (H) verifying with second sensor means passage of said bobbin core through said second chute in step (D).

7. The method of claim 6, wherein said first sensor means is comprised of a first magnetic sensor positioned adjacent to said second end of said first chute and a second magnetic sensor positioned adjacent to said first end of said second chute.

8. The method of claim 7, wherein said second sensor means is comprised of an optical sensor positioned along said second chute.

9. The method of claim 8, wherein said bobbin winding device is a winding arbor for winding dental floss.

* * * * *